United States Patent Office 2,774,634
Patented Dec. 18, 1956

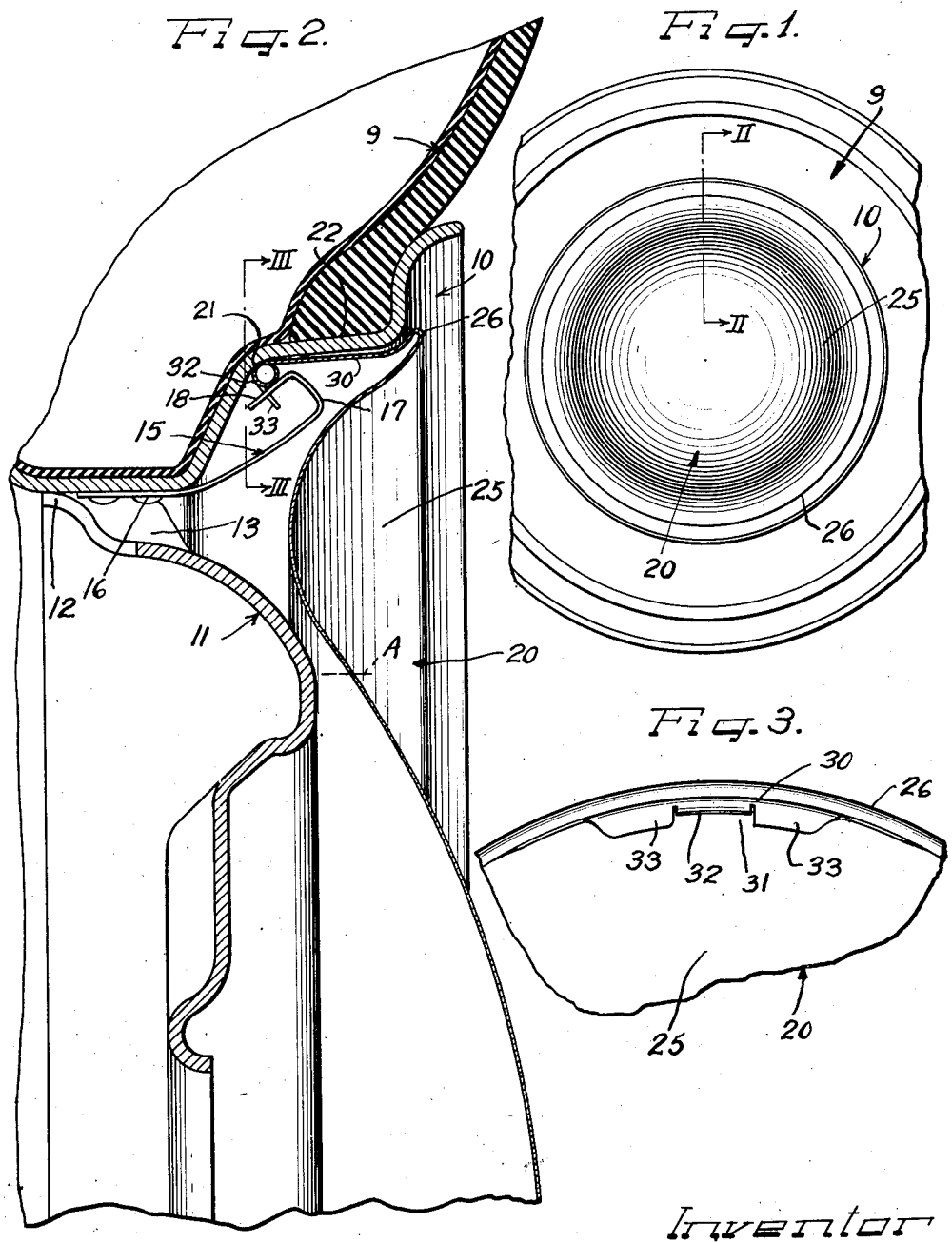

2,774,634
WHEEL COVER

George Albert Lyon, Detroit, Mich.

Application July 30, 1952, Serial No. 301,633

11 Claims. (Cl. 301—37)

This invention relates to a wheel structure and more particularly to ornamental wheel cover means for automobile wheels.

At the present time automobile manufacturers are using 15" and 16" wheels having relatively wide drop center type multi-flanged tire receiving rims. I have observed that in the use of such wheels there is a tendency for the wheel to transversely flex, particularly in the rim area and especially when the wheel is rolling over rough pavement or roads. Such distortion or flexure of the wheel might result in accidental displacement of a wheel cover or hub cap detachably held on the wheel unless some provision is made to permit the cover to float irrespective of such distortions or flexures of the wheel.

Accordingly, it is an aim of this invention to provide a wheel cover structure which can be detachably held on the wheel in a floating condition and which will be less apt to be forcibly displaced from the wheel in response to undue stressing or distortion of the wheel in operation.

Another object of this invention is to provide a wheel structure which lends itself to economical manufacture on a large production basis.

Yet another object of this invention is to provide novel yet simple retaining means for supporting an ornamental member on a wheel whereby it can be floatingly carried on the wheel and yet be susceptible to ready detachment through the use of a suitable pry-off tool.

According to the general features of the present invention there is provided in a wheel structure including a body part and a tire rim having a radially inwardly facing flange, a circular wheel cover for the outer side of the wheel having a peripheral pry-off shoulder beyond said rim flange and a plurality of spaced resilient fingers arcuate in a circumferential direction projecting inwardly from said shoulder in cooperation with the inner surface of said rim flange to floatingly support said cover, and means at the inner extremity of said fingers cooperating to hold them in cover retaining engagement with said flange.

In accordance with other general features of this invention there is provided a circular wheel cover member having an underturned generally axially extending flange portion spaced from a flange of the wheel but provided with an extremity yieldable radially inwardly upon contact with the rim flange and also having a radially inwardly facing shoulder engageable by retaining spring clip means on the wheel so that the cover is resiliently supported in floating condition on the wheel and yet readily detachable upon the application of pry-off force to an edge of the cover member.

Another feature of the invention relates to the notching out of the underturned flange of the cover to provide an opening for receiving an extremity of a spring clip as well as a shoulder engageable by a turned yieldable extremity of the spring clip.

Other objects and features of this invention will more fully appear from the following detailed description taken in connection with the accompanying drawings which illustrate certain preferred embodiments thereof and in which:

Figure 1 is a fragmentary side elevation showing a wheel structure having my novel ornamental member or cover applied thereto;

Figure 2 is an enlarged fragmentary radial cross-sectional view taken on the line II—II of Figure 1 taken in the direction indicated by the arrows; and Figure 3 is a fragmentary detail view taken substantially on the line III—III of Figure 2 and showing the construction of one of the notched out corner flanges of the cover member.

As shown on the drawings:

The reference character 9 designates generally a conventional pneumatic tire and tube assembly mounted in the usual way upon a multi-flanged drop center tire rim designated generally by the reference character 10. This tire rim is supported in the usual manner by a dished metal central body part 11 adapted to be detachably bolted in place on the axle of a vehicle in a manner well known in the art.

The rim and body parts 10 and 11 are connected together at spaced intervals 12 and have axially extending openings 13 between the connections as is also well known in the art.

A cover retaining element in the form of a spring clip designated generally by the reference character 15 may extend in each of the openings 13 and may be suitably fastened by rivets 16 to a base flange of the tire rim 10. These clips 15 are all identical and may be of any suitable number such, for example, as 4, depending on the number of openings 13 in the wheel.

Each of the clips 15 has a radially outwardly turned goose-neck like extremity 17 terminating in a shoulder portion 18 adapted to be cammingly engaged by rear edge portions of a cover or ornamental member designated generally by the reference character 20 to be hereinafter described.

This hump type of clip is now well known in the art and more specifically is of a type which permits of an "easy-on hard-off" action in the application and removal of the cover. The clips are usually made of spring steel so that they possess a relatively great amount of resiliency.

While the clips 15 are of a known type, I propose in the present structure to locate them in a different position so that the free extremity of the clip can be effective to retain floatingly the cover member 20 on the wheel. In other words, I propose to place the extremities 17 of the clips 15 in close proximity to the juncture portion 21 of one of the axially extending and radially inwardly facing flanges 22 of the rim 10 with the connected generally axially outwardly facing side flange of the rim and with the retaining shoulders 18 facing generally axially inwardly toward the wheel portion 21.

The ornamental or cover member 20 may be made from any suitable sheet material although I propose to make the cover from a metallic dished stamping.

It is customary in manufacturing wheel covers to stamp them from sheet steel and usually the corners left over after the stamping becomes waste or scrap. My present cover proposes to utilize this scrap in the cover itself. More specifically, I propose to turn the corners under the main body of the circular stamping so that they will serve as retaining flange portions for the cover 20.

It will, of course, be appreciated that if the stamping is a square stamping, the corners may be four in number. For this reason I prefer to refer to the stamping from which my cover 20 is made as a polygonal shaped stamping.

It will be noted that the main body of the cover comprises a circular dished concave-convex stamping 25 with an outer peripheral turned reinforcing circular edge or shoulder 26. This edge or shoulder 26 when the cover is on the wheel is disposed beyond and out of contact with the rim and is in fact slightly spaced therefrom so that the end of a pry-off tool such as a screw driver can be inserted in the space to work against the shoulder and forcibly eject the cover from the wheel when it is desired to have access to the usual wheel bolts (not shown) at the center of the wheel.

Each of the corners of the stamping from which my cover 20 is made is turned under the main body 25 and formed into an axially extending resilient elongated cover-retaining flange or finger extensions 30. It should be noted that all of the corner flanges or fingers are preferably made identical and hence, a description of one will suffice for all.

Each of the inwardly projecting fingers 30 is spaced from the adjoining flange 22 of the rim 10 (Figure 2) but is preferably provided with means to define a predetermined limit of inward movement of the cover, such means herein being adapted to yieldably bottom at 21 on the rim and comprising axially inwardly facing stop surface portions or the distal extremity or terminal portions of the fingers. In other words, when the cover 20 is pressed fully home against the wheel, the axially inner portions of the fingers 30 are under resilient tension, thereby causing these fingers 30 to resiliently grip the rim 10 and stop against the generally axially outwardly facing portion of the juncture 21 disposed axially and radially inwardly adjacent to the rim flange 22 at the side flange of the tire rim.

Means are provided at the inner extremities of the fingers 30 cooperating to hold them in cover retaining engagement with the tire rim flange 22. To this end the axially innermost extremity of each of the fingers 30 is notched out at 31 and the notched out portion is turned into a curled shoulder portion 32 providing a generally axially outwardly facing shoulder which is spaced substantially axially outwardly from the stop surface portion of the finger and is engageable by the retaining shoulder portion 18 of the extremity 17 of the spring clip 15 (Figure 3). By notching out the fingers 30 I provide an opening for receiving the end of the clip which opening or recess is flanked by portions 33—33 of the inner extremity terminal flange structure of the corner flange.

In the application of the cover 20, it is placed over the wheel and the notches 31 of the fingers 30 are aligned with the free extremities 17 of the spring clips 15. Then the cover is pressed axially into the wheel causing the turned shoulder portions 32 to ride over the resiliently yielding humped ends 17 of the spring clips until the shoulder portions 32 are behind the extremity shoulders 18 of the clips. In this relationship, the oppositely circumferentially facing surfaces at the edges of the clip shoulder portions 18 engageably face the opposing spaced apart circumferentially facing surfaces at the inner edges defining the recesses 31 to hold the cover against turning on the wheel.

As the shoulder portions 32 pass over the high points of the clips 15 the axially inner extremities of the fingers 30 engage the bottom portion 21 of the rim flange 22 at juncture with the side flange of the tire rim which resiliently cam the fingers toward the axis of the wheel so that the fingers are under resilient stress. In other words, the fingers 30 are not only resiliently gripped by the retaining clips but in addition are held under stress by being slightly distorted toward the axis of the wheel. This is accomplished by having the inner end portions of the fingers 30 normally on at least a slightly greater diameter than the inner diameter of the inner portion of the tire rim intermediate flange 22.

On the other hand, the outer reinforcing shoulder 26 of the cover body 25 is at all times out of contact with the rim so that the outer flanges of the rim can flex in the use of the wheel without affecting the cover. As a matter of fact, any distortion of the rim will not result in displacement of the cover, as the cover is floatingly held on the wheel by the fingers 30 and the means at the inner ends of the fingers, here comprising the spring clips 15.

It will be observed that each of the retaining fingers 30 is of substantial width, tapering from the reinforcing and pry-off shoulder 26 at each side toward the distal or inner end portion, as best seen in Figure 3. In addition, each of the retaining fingers 30 is of arcuate transverse or peripheral shape. As a result, each of the fingers 30 is highly resilient, and while it is susceptible of radial resilient stressing, especially radially inwardly upon application to the wheel, the wide, tapered, transversely arcuate structure of the retaining fingers 30 assures a high degree of resilient stress toward the tire rim flange 22.

It will also be observed in Figure 2 that in the fully applied condition of the cover 20 to the wheel, and even though the retaining fingers 30 are substantially stressed by reason of having been forced radially inwardly at their tips when cammed inwardly along the tire rim flange 22, only the extremity portions of the fingers engage the flange 22 and the remainder or body portions of the retaining fingers 30 are out of contact with the intermediate tire rim flange so that substantial radial floating movement of the cover is enabled by radial resilient flexing of the fingers relative to the wheel flange 22 about a fulcrum at the inner extremities of the fingers.

While I have shown the cover 25 in the form of a full disk or cap, the center portion could be cut out of the body 25 on the dotted line A in which case the member 20 would be in the form of an ornamental ring. In that event the central part of the wheel could be covered by the usual hub cap in a manner well known by those familiar with this wheel art.

The subject matter disclosed herein is a continuation-in-part of my earlier filed parent application, Serial No. 37,996, filed July 10, 1948, now abandoned.

It will be understood that modifications and variations may be effected without departing from the scope of the novel concepts of the present invention.

I claim as my invention:

1. As an article of manufacture, a circular wheel cover made from a polygonal shaped stamping having the corners of the stamping turned under the main body of the cover, each of said corners comprising an axially extending resilient flange notched out at the rear extremity to define an opening of sufficient width for receiving a cover retaining spring clip, the base of said notched portion being turned upon itself toward the cover proper and forming a shoulder at said opening engageable by a spring clip.

2. In a wheel structure including a wheel having a multi-flanged tire rim part, a body part connected thereto, and cover retaining spring clips connected to one of said parts adjacent their juncture, a wheel cover for disposition on the outer side of said wheel made from a polygonal shaped stamping having the corners of the stamping turned under the main body of the cover, each of said corners comprising an axially extending resilient flange having its end portion yieldable upon pressure against one of the flanges of the rim part and having a shoulder engageable by at least one of said spring clips for floatingly supporting and retaining the cover on the wheel and in engagement with said flange of the rim part.

3. In a wheel structure including a multi-flanged tire rim having a generally axially extending intermediate flange and a side flange angularly disposed at the inner margin of said intermediate flange, a full disk cover for the outer side of the wheel including a plurality of spaced underturned individual marginal flange portions each of which is axially inwardly elongated, said elongated flange portions being disposed on a diameter to engage under resilient stress against the inner margin of the tire rim intermediate flange and being of a length to bottom against the side flange of the tire rim at a juncture with the intermediate flange and thereby support the margin of the cover in spaced relation beyond the outer margin of the intermediate flange so that the cover is floatingly supported on the wheel, and means for releasably securing the elongated flange portions against axially outward displacement from the wheel.

4. In a wheel structure including a multi-flanged tire rim having a generally axially extending intermediate flange and a side flange angularly disposed at the inner margin of said intermediate flange, a full disk cover for the outer side of the wheel including a plurality of spaced underturned individual marginal flange portions each of which is axially inwardly elongated, said elongated flange portions being disposed on a diameter to engage under resilient stress against the inner margin of the tire rim intermediate flange and being of a length to bottom against the side flange of the tire rim at a juncture with the intermediate flange and thereby support the margin of the cover in spaced relation beyond the outer margin of the intermediate flange so that the cover is floatingly supported on the wheel, and a plurality of retaining clips carried by the wheel inwardly of said marginal portions and engaging with the inner ends of the marginal portions to retain the same in place to thereby retain the cover against axial displacement from the wheel.

5. In a wheel structure including a multi-flanged tire rim having a generally axially extending intermediate flange and a side flange angularly disposed at the inner margin of said intermediate flange, a full disk cover for the outer side of the wheel including a plurality of spaced underturned individual marginal flange portions each of which is axially inwardly elongated, said elongated flange portions being disposed on a diameter to engage under resilient stress against the inner margin of the tire rim intermediate flange and being of a length to bottom against the side flange of the tire rim at a juncture with the intermediate flange and thereby support the margin of the cover in spaced relation beyond the outer margin of the intermediate flange so that the cover is floatingly supported on the wheel, and a plurality of retaining clips carried by the wheel inwardly of said marginal portions and engaging with the inner ends of the marginal portions to retain the same in place to thereby retain the cover against axial displacement from the wheel, the inner end portion of each of said elongated flange portions being formed with a pair of spaced generally radially and axially inwardly extending extremity elements defining a notch having a base shoulder receptive of the respective retaining clip.

6. In a wheel structure including a multi-flanged tire rim, a plurality of retaining spring clips carried by the base portion of the rim and having retaining head portions, the tire rim having a side flange and a generally axially outwardly extending intermediate flange defining a reentrant angular juncture and the retaining head portions of the clips being directed toward said juncture, a cover for the outer side of the wheel including a marginal underturned retaining flange structure including a plurality of generally axially inwardly extending elongated retaining flange portions resiliently engaging at their extremities against the intermediate flange adjacent said juncture and bottomed against the side flange at said juncture, each of said flange portions having a generally radially inwardly extending shoulder engaged by a retaining clip and being of a length to retain the marginal exposed extremity of the cover in spaced relation to the axially outer margin of the intermediate flange.

7. In a cover for disposition at the outer side of a wheel having a multi-flanged tire rim having a side flange and an intermediate flange joined on a reentrant angular juncture, said cover comprising a body of a diameter to substantially conceal the outer side of the wheel including the tire rim and having an underturned marginal flange portion including a plurality of spaced elongated flange extensions of a length to seat at the juncture of said tire rim flanges and being of resilient structure and with the terminal portions thereof disposed on a diameter to engage under resilient stress against the inner margin of the intermediate flange of the tire rim, said elongated flange extensions having generally radially inwardly extending shoulder structure at the inner extremity portions thereof for engagement by spring clips on the wheel for retaining the cover on the wheel.

8. In a cover for disposition at the outer side of a multi-flanged tire rim having a side flange and an intermediate flange joined on a reentrant angular juncture, said cover comprising a body of a diameter to substantially conceal the outer side of the wheel including the tire rim and having an underturned marginal flange portion including a plurality of spaced elongated flange extensions of a length to seat at the juncture of said tire rim flanges and being of resilient structure and with the terminal portions thereof disposed on a diameter to engage under resilient stress against the inner margin of the intermediate flange of the tire rim, the inner terminal portion of each of the elongated flange portions having a generally radially inwardly and axially outwardly turned terminal structure comprising a spaced apart pair of elements and a curled intermediate shoulder defining a notch receptive of a retaining spring clip carried by the wheel.

9. In a wheel structure including a multi-flanged tire rim, the tire rim having a side flange and a generally axially outwardly extending intermediate flange defining a reentrant angular juncture, a cover for the outer side of the wheel including a marginal underturned retaining flange structure including a plurality of generally axially inwardly extending elongated retaining flange portions resiliently engaging at their extremities against the intermediate flange adjacent said juncture and bottomed against the side flange at said juncture, each of said flange portions having a generally radially inwardly extending shoulder at the extremity thereof reinforcing the same and the flange portions being of a length to retain the marginal exposed extremity of the cover in spaced relation to the axially outer margin of the intermediate flange.

10. In a wheel structure including a body part and a tire rim having a radially inwardly facing flange, a circular wheel cover for the outer side of the wheel having a peripheral pry-off shoulder beyond said rim flange and a plurality of spaced resilient cover retaining fingers arcuate in a circumferential direction projecting inwardly from said shoulder and convergently relative to said wheel flange so as to be spaced radially inwardly from the inner surface of said rim flange except inner extremity portions thereof to enable radial resilient flexing of said fingers relative to said wheel flange about a fulcrum at the inner extremities of the fingers, whereby to floatingly support the cover, and means on the wheel adjacent to the inner extremity portions of said fingers engageable in cover retaining press-on, pry-off relation therewith.

11. In a wheel structure including an annular radially inwardly facing flange portion and a portion axially and radially inwardly therefrom and facing generally axially outwardly, with a plurality of cover-retaining elements on the wheel having shoulders facing generally axially inwardly and spaced axially outwardly from said axially outwardly facing wheel portion, said retaining shoulder elements also having opposite circumferentially facing surfaces, a cover for disposition at the outer side of the wheel having a circular portion thereon with a plurality of circumferentially spaced cover retaining turned elongated extensions in one piece therewith including terminal flange structure having respective terminal recesses therein affording generally axially outwardly facing shoulders for cover-retaining engagement with said shoulders of the retaining elements and also having opposed circumferentially facing surfaces engageably facing said retaining element oppositely facing surfaces to hold the cover against turning on the wheel, and said cover retaining extensions further including respectively generally axially inwardly facing stop surface portion spaced substantially axially inwardly from said terminal recess shoulders for bottoming on said axially outwardly facing wheel portion to define the axially inward dis-position of said extensions and thereby said extension recess retaining shoulders for assuring firm retaining engagement thereof with said shoulders of the retaining elements.

References Cited in the file of this patent

UNITED STATES PATENTS

| | | |
|---|---|---|
| 1,944,658 | Griffith | Jan. 23, 1934 |
| 2,239,366 | Lyon | Apr. 22, 1941 |
| 2,368,228 | Lyon | Jan. 30, 1945 |